United States Patent
Reichwein et al.

(10) Patent No.: US 8,512,848 B2
(45) Date of Patent: Aug. 20, 2013

(54) ADHESIVELESS DECORATIVE FLOOR TILE

(75) Inventors: David P. Reichwein, Elizabethtown, PA (US); Keith A. Pocock, Shanghai (CN)

(73) Assignee: GIP International Limited, Central Hong Kong (HK)

( * ) Notice: Subject to any disclaimer, the term of this patent is extended or adjusted under 35 U.S.C. 154(b) by 0 days.

(21) Appl. No.: 13/308,049

(22) Filed: Nov. 30, 2011

(65) Prior Publication Data

US 2012/0117909 A1     May 17, 2012

Related U.S. Application Data

(63) Continuation-in-part of application No. 12/923,369, filed on Sep. 16, 2010, now Pat. No. 8,298,650, and a continuation-in-part of application No. 13/165,246, filed on Jun. 21, 2011.

(60) Provisional application No. 61/463,962, filed on Feb. 25, 2011.

(51) Int. Cl.
  *B32B 3/00* (2006.01)
  *B32B 3/28* (2006.01)
  *B32B 3/30* (2006.01)

(52) U.S. Cl.
  USPC ............................ 428/156; 428/99; 428/167

(58) Field of Classification Search
  USPC .............. 428/156, 167, 172, 99; 4/581, 582; 5/417, 420; 15/215, 216, 217, 238
  See application file for complete search history.

(56) References Cited

U.S. PATENT DOCUMENTS

| | | | |
|---|---|---|---|
| 2,081,992 A | 3/1936 | Gavlak | |
| 2,325,903 A * | 8/1943 | Blair et al. | 264/45.5 |
| 4,698,258 A | 10/1987 | Harkins, Jr. | |
| 5,059,474 A | 10/1991 | Yoshida | |
| RE34,357 E | 8/1993 | Eckert et al. | |
| 6,006,486 A | 12/1999 | Moriau et al. | |
| 6,014,779 A | 1/2000 | Lindholm | |
| 6,167,879 B1 | 1/2001 | Sievers et al. | |
| 6,287,664 B1 | 9/2001 | Pratt | |
| 6,851,241 B2 | 2/2005 | Pervan | |
| 7,155,871 B1 | 1/2007 | Stone et al. | |
| 7,906,191 B2 | 3/2011 | Pratt | |
| 2005/0037177 A1 | 2/2005 | Streeton et al. | |
| 2005/0100711 A1 | 5/2005 | Malpass et al. | |
| 2009/0077917 A1 | 3/2009 | Lai | |
| 2011/0076457 A1 | 3/2011 | Reichwein et al. | |
| 2011/0183101 A1 | 7/2011 | Voith et al. | |

FOREIGN PATENT DOCUMENTS

| | | |
|---|---|---|
| CN | 2392845 | 8/2000 |
| CN | 201318011 | 9/2009 |
| DE | 202006009037 | 8/2006 |
| JP | 11172906 | 6/1999 |
| KR | 1020070076671 | 7/2007 |

* cited by examiner

*Primary Examiner* — Catherine A Simone
(74) *Attorney, Agent, or Firm* — Duane Morris LLP

(57) ABSTRACT

A decorative floor tile including at least one decorative layer and a backing layer having an array of resilient annular projections. Each annular projection includes a concave top surface, an outside wall surface, and an inside wall surface. The inside wall surface defines a central, blind passageway area. When the decorative floor tile is installed over an underlying surface, and pressure is applied to the decorative floor tile, a vacuum is created within the blind passageway and the underlying surface. The vacuum increases the amount of frictional drag between the surface covering and the underlying surface, and thus allows the surface covering to remain in place without the need for an adhesive.

19 Claims, 16 Drawing Sheets

ADHESIVELESS DECORATIVE FLOOR TILE

CROSS-REFERENCE TO RELATED APPLICATIONS

This application is a continuation-in-part application of copending U.S. patent application Ser. No. 12/923,369, filed Sep. 16, 2010, and entitled Hollow Base Decorative Surface Covering; copending U.S. patent application Ser. No. 13/165,246, filed Jun. 21, 2011, entitled Adhesiveless Decorative Floor Tile, and also claims priority from Provisional Patent Application Ser. No. 61/463,962, filed on Feb. 25, 2011, entitled Surface Covering Having A Back Surface Comprising Hollow regions.

FIELD OF THE INVENTION

The present invention relates to decorative surface coverings, including flooring materials.

BACKGROUND OF THE INVENTION

Sub-floor surfaces are often covered with resilient flooring products using adhesives. Such adhesives may be applied directly to the sub-floor, or to the back of the resilient tile products by the manufacturer. Flooring products often stay in place during use, and can be subjected to walking forces, dragging forces, rolling load forces, indentation forces, and sub-floor movement due to dimensional instability. Flooring products must stay flat, not curl. Seams, especially between tiles, must not move or open. There have been many attempts to develop flooring products that do not require adhesives. Some involve so-called "loose lay" constructions as taught in U.S. Pat. Nos. 4,698,258 and RE34,357. Many interlocking tile designs have been the subject of prior art patents. Recently, U.S. Pat. No. 7,155,871 discloses two-sided ship-lap vinyl plank with adhesive located on the ship-lap surface. However, none of these tile technologies have had significant commercial success. There remains a need for resilient decorative floor tiles that do not require adhesives.

Suction cups have been utilized in bath mat constructions as defined in U.S. Pat. Nos. 6,014,779 and 2,081,992, and US Patent Application No. 2005/0100711. While this approach provides acceptable slip-resistance for light shower and bath mat applications, traditional suctions cups do not provide sufficient anti-skidding forces to prevent slippage do to movement in high traffic and high load areas. Traditional suction cups often yield an uneven mat surface which is more difficult for individuals and loads to traverse.

SUMMARY OF THE INVENTION

One embodiment of the present invention provides an adhesiveless decorative floor tile that includes a decorative layer and a backing layer. An array of discreet continuous resilient projections are located on an outer surface of the backing layer. The array of resilient projections are arranged with respect to one another so as to form recessed regions that are defined by the resilient projections so that when pressure is applied to the decorative layer, a partial vacuum is formed within each recessed region allowing the decorative floor tile to remain in place on a surface in the absence of adhesive. When the decorative floor tile is installed over an underlying surface, e.g., a sub-floor, the vacuum increases the amount of frictional drag between the decorative tile and the underlying surface, thus allowing the decorative tile to remain in place without the need for an adhesive.

In another embodiment, a decorative floor tile includes at least one decorative layer and a backing layer comprising an array of resilient continuous sinusoidal walls, wherein each wall comprises an exposed top surface, an outside wall surface, and together define a void between adjacent walls. When the decorative floor tile is installed over an underlying surface, and pressure is applied to the decorative floor tile, at least a partial vacuum is created within portions of the void between projections which adheres the floor tile to the underlying surface. The partial vacuum increases the amount of frictional drag between the tile and the underlying surface, and thus allows the tile to remain in place without the need for an adhesive.

DETAILED DESCRIPTION OF EMBODIMENTS

Figure 1:
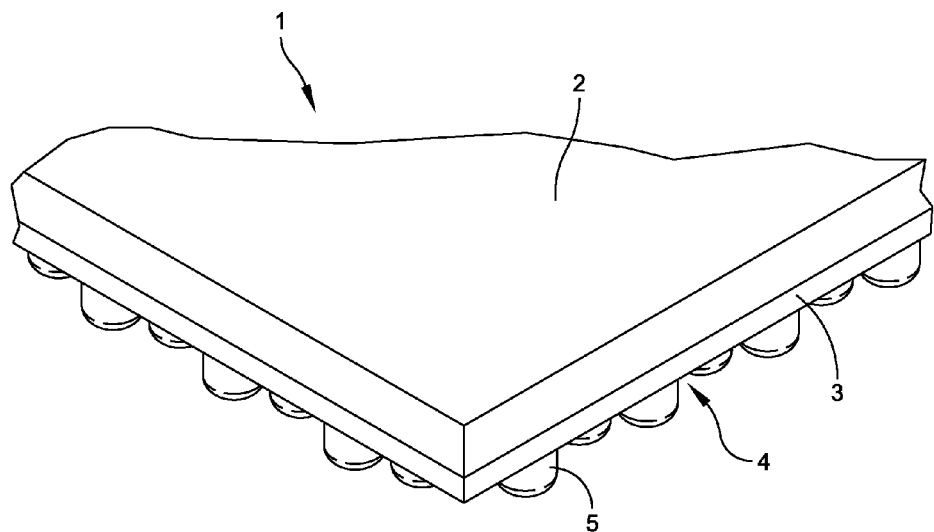
FIG. 1 is a broken-away, perspective view of a decorative floor tile formed in accordance with one embodiment of the invention.

This description of preferred embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral," and the like are to be interpreted relative to one another or relative to an axis of elongation, or an axis or center of rotation, as appropriate. Terms concerning attachments, coupling, and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
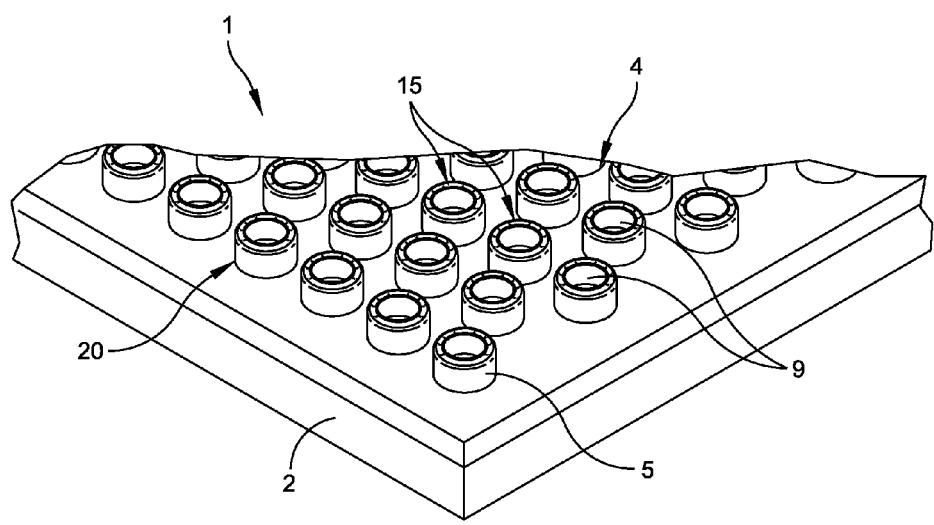
FIG. 2 is a broken-away, perspective view of a decorative floor tile showing a backing layer including a plurality of annular projections arranged in an array.

Referring to FIGS. 1 and 2, a decorative floor tile 1 formed in accordance with one embodiment of the invention includes a decorative layer 2, e.g., a 15.3 cm×91.5 cm, Luxury Vinyl Tile Plank, and an elastomeric, non-porous backing layer 3 having an array 4 of annular projections 5 on the exposed surface. In one embodiment, decorative layer 2 is a flooring material. In another embodiment, decorative layer 2 is selected from a group including a resilient tile, plank, or sheet structure, and laminate plank or tile structure. In a further embodiment, decorative layer 2 is an 18"×18" Luxury Vinyl Tile. In yet another embodiment, the decorative layer 2 is an interlocking laminate product.

Decorative layer 2 may be traditional laminate flooring products having a decorative layer. Some examples include the interlocking type of laminate flooring products such as those described in U.S. Pat. Nos. 6,851,241, and 6,006,486 which have found commercial success as "free floating" flooring. These flooring products employ a foam underlayment between the laminate product and the underlying subfloor. In some cases, the foam underlayment can be attached to the underside of the laminate product by the manufacturer. We have discovered that utilizing the backing layer 3 of the current invention in place of the traditional foam has advantages over the prior art. Backing layer 3 not only helps to keep the laminate in place, but also provides some improvement in impact sound and transmitted sound properties. The laminate product structure has increased thickness and stiffness, and show-through of the geometric array of backing layer 3 is less of an issue. In the case of laminate products as decorative layer 2 height may often be increased.

Figure 3:
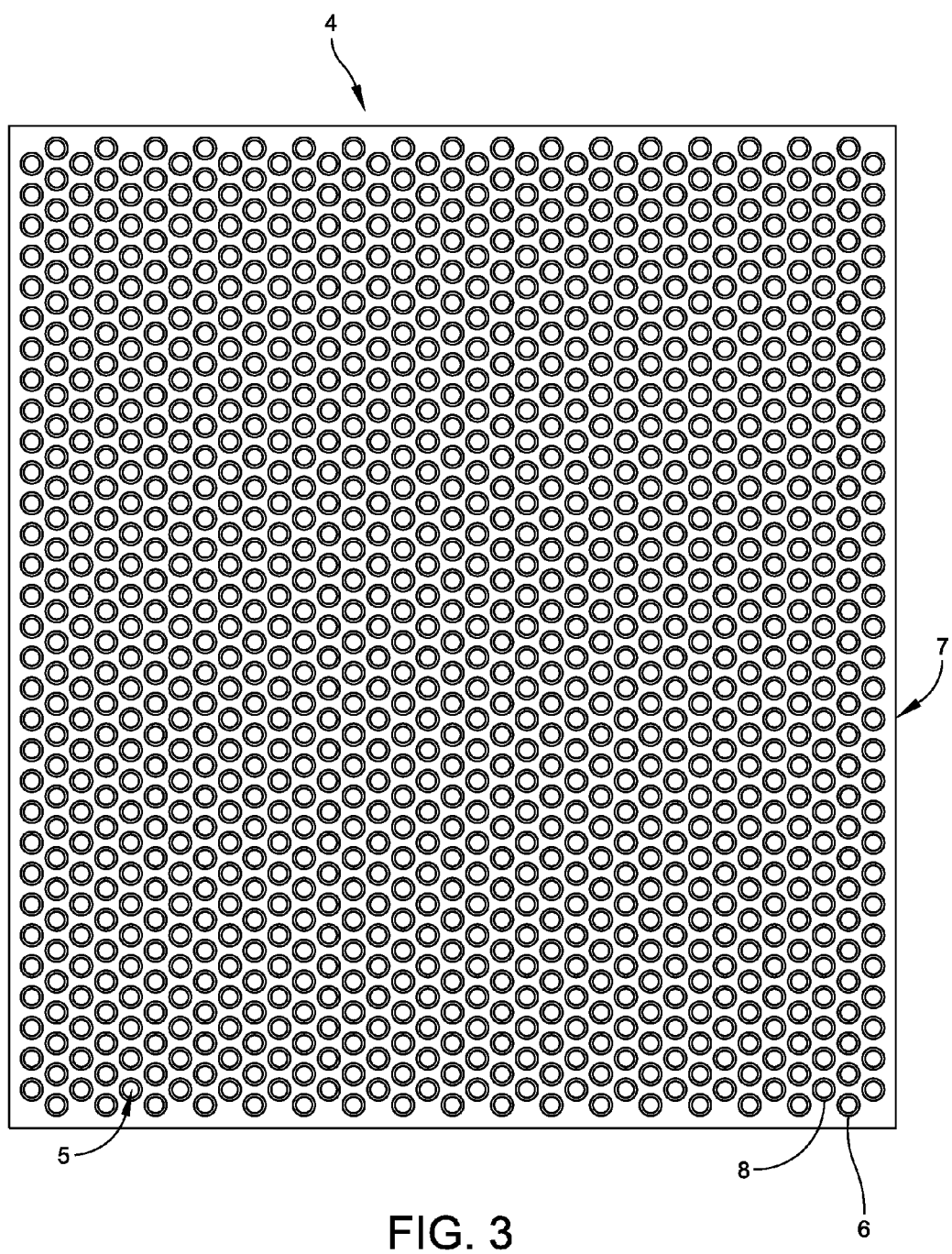
FIG. 3 is a plan view of the embodiment shown in FIG. 2, illustrating one pattern of array of resilient, annular projections on an exposed face of a backing layer.
Figure 4:
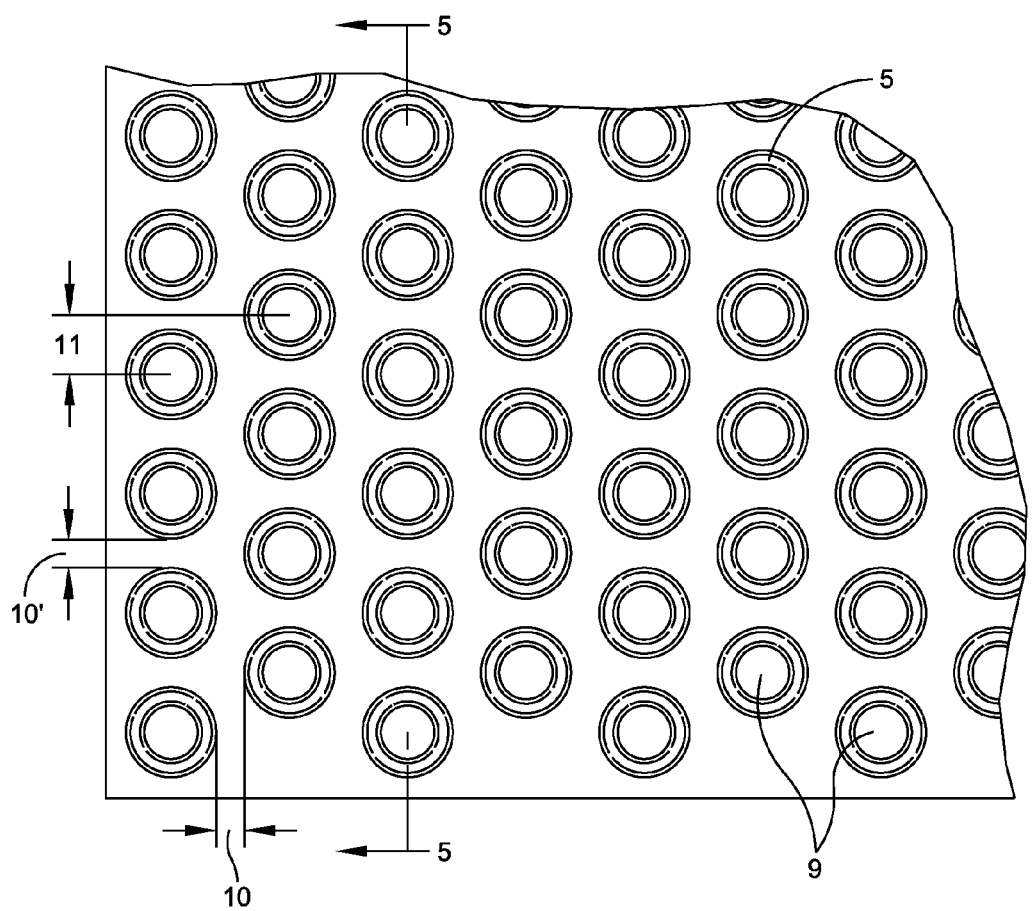
FIG. 4 is a broken-away plan view of the array shown in FIG. 2.
Figure 5:
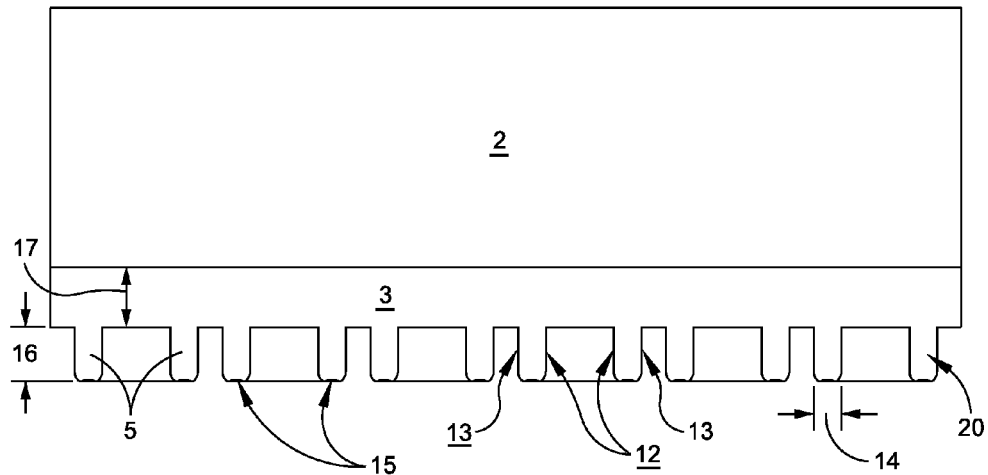
FIG. 5 is a cross-sectional view according to line 5-5 of FIG. 4.
Figure 6:
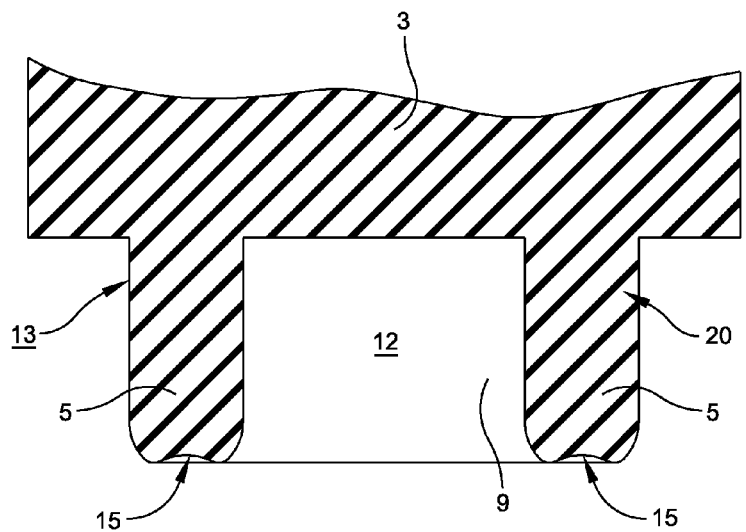
FIG. 6 is a broken-away, cross-sectional view of an annular projection formed in accordance with one embodiment of the invention.

Array 4 of annular projections 5 is often organized in rows 6 that are parallel to the decorative layer's longitudinal edge 7, with alternating rows 8 offset on center across the width of array 4. Referring to FIGS. 3-4, annular projections 5 often each comprise a substantially cylindrical blind tube that defines an internal passageway 9. Annular projections 5 are best formed from materials that are able to spring back quickly into shape after being bent, stretched, or squashed, i.e., resilient materials that are capable of storing and releasing energy. Elastomeric compounds are one such resilient material that has been found to yield acceptable results when incorporated with the structures of the present invention.

In some embodiments of the invention, the distance 10 between annular projections 5 within the rows, and between the rows 10', is between about 1.0 mm-1.2 mm with the alternating rows off-set 11 between about 2.4 mm-2.6 mm on center across the width of array 4. Annular projections 5 are preferably defined by an inside surface 12 and an outside surface 13, that together define a ring wall 20 of each projection 5. The inside diameter of passageway 9 defined by inside surface 12 is often in the range from about 1.9 mm-2.1 mm. The outside diameter of each annular projection 5 is often in the range from about 3.7 mm-4.0 mm resulting in a ring wall thickness 14 of between 0.75 mm-1.2 mm. An exposed, top edge 15 of each ring wall 20 may define a concave surface. Each annular projection preferably has a height 16 in the range from about 0.8 mm-1.2 mm above the surface of backing layer 3 which has a thickness 17 in the range from about 0.13 mm-0.17 mm. Annular projections 5 may also comprise, triangles, squares, rectangles, ovals, pentagons, hexagons, other polygons, or mixtures thereof.

Figure 7:
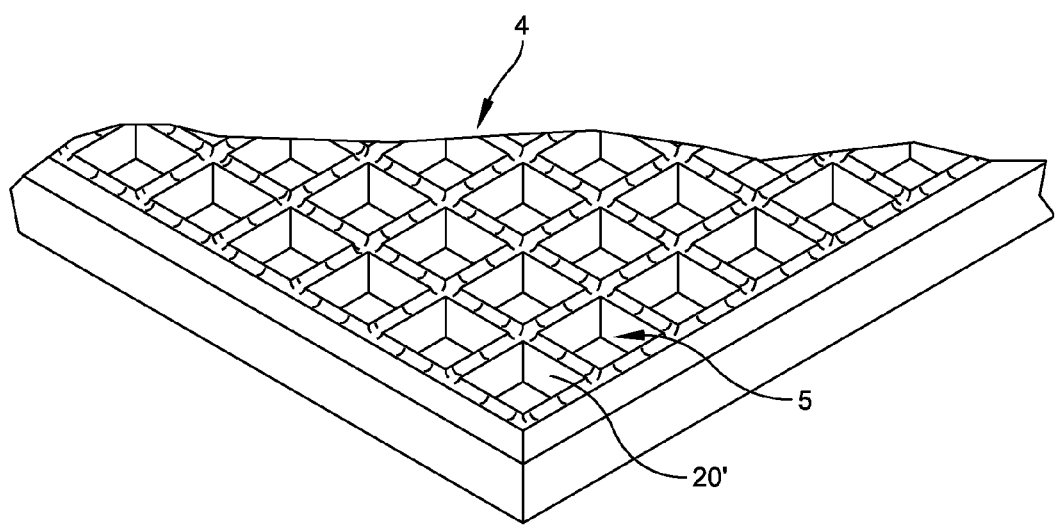
FIG. 7 is a broken-away, perspective view of another embodiment of decorative floor tile formed in accordance with the invention, showing a backing layer including an alternative array of resilient projections.
Figure 8:
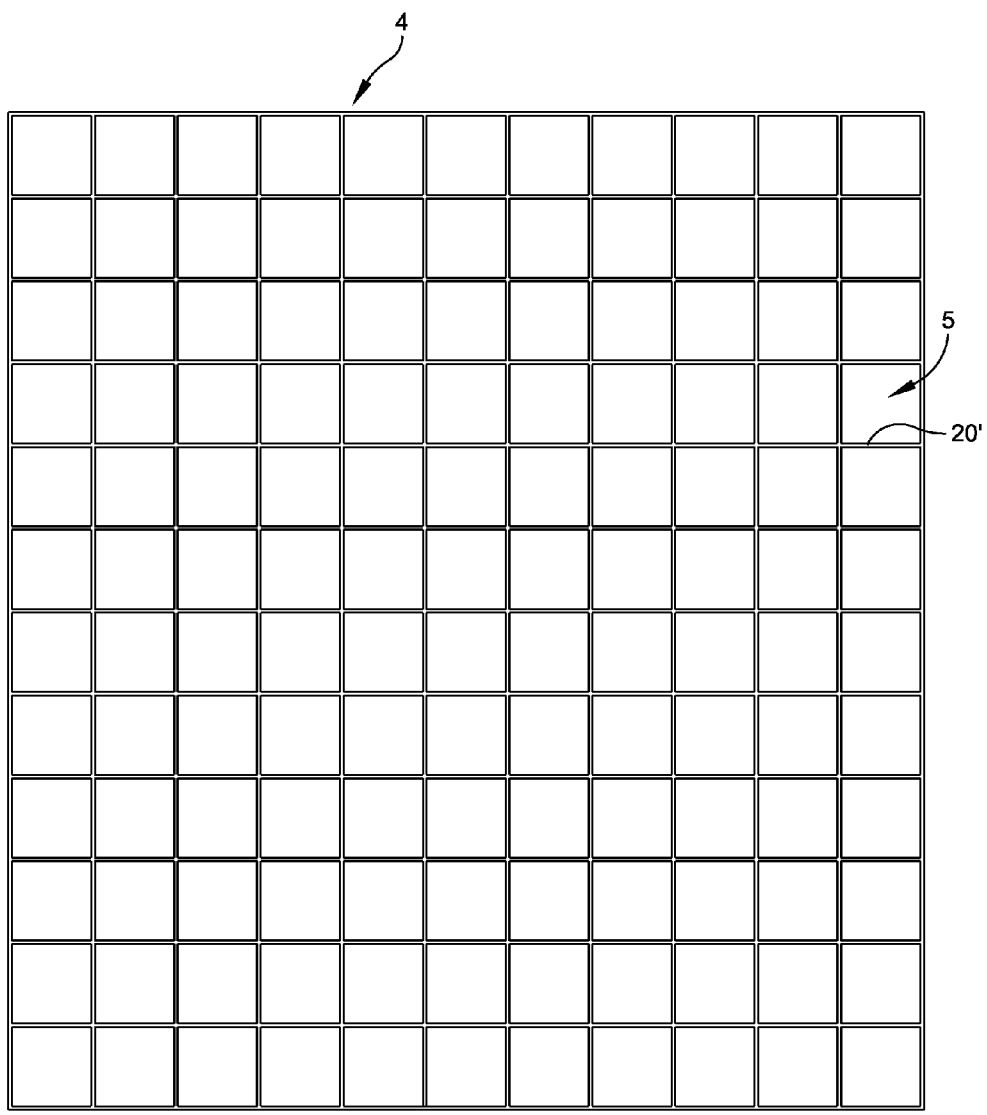
FIG. 8 is a plan view of the embodiment shown in FIG. 7, illustrating one pattern of array of resilient projections on an exposed face of a backing layer.
Figure 9:
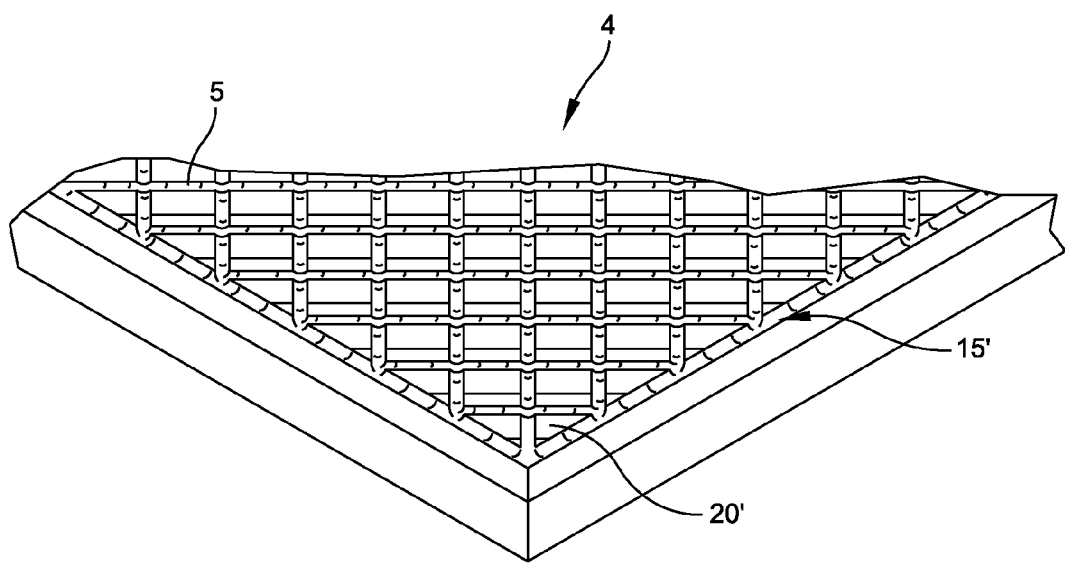
FIG. 9 is a broken-away, perspective view of yet another embodiment of decorative floor tile formed in accordance with the invention, showing a backing layer including an alternative array of resilient projections.
Figure 10:
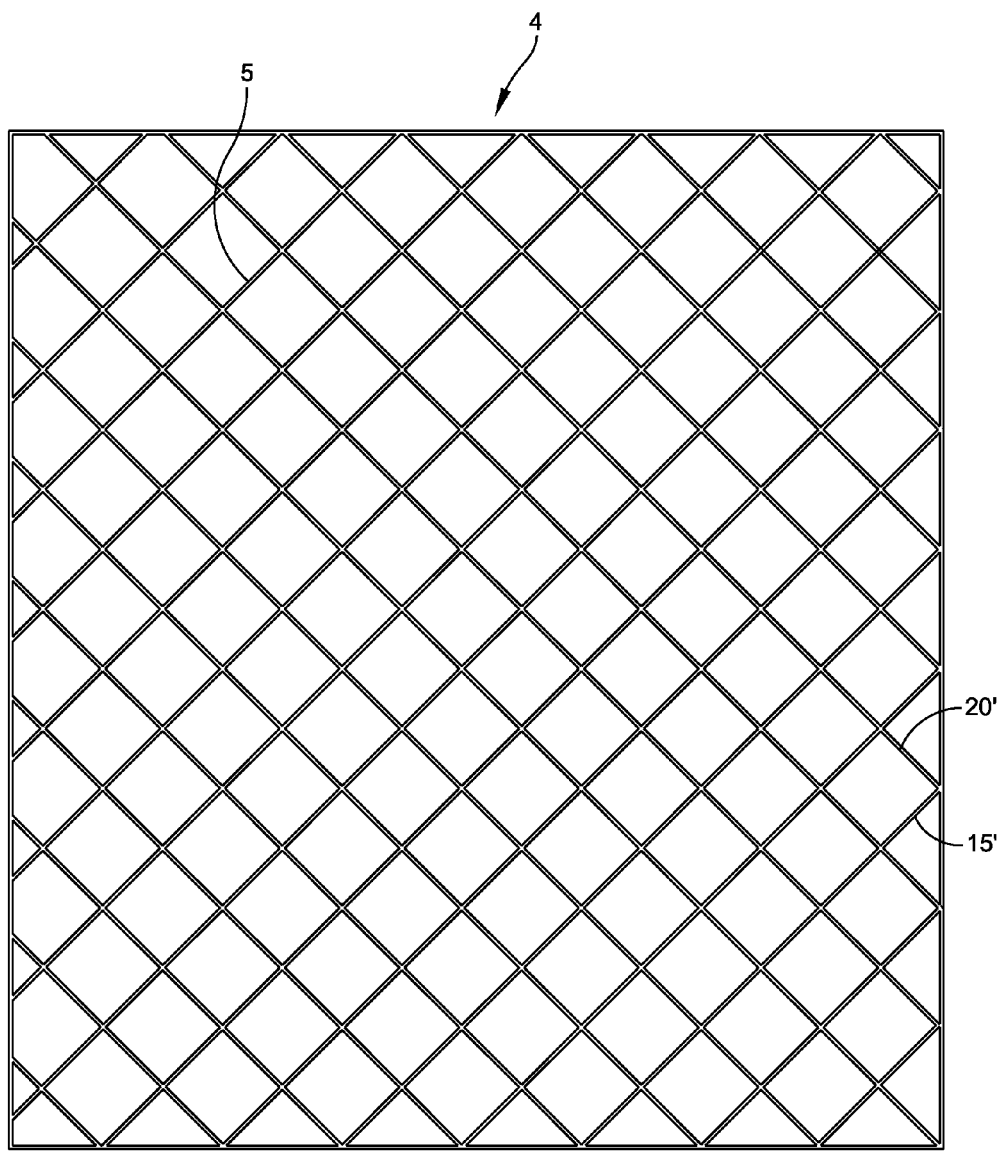
FIG. 10 is a plan view of the embodiment shown in FIG. 9, illustrating another pattern of array of resilient projections on an exposed face of a backing layer.

It is within the scope of this invention to change size, number, shape, and dimensions of the annular projections 5 depending upon size and shape of decorative layer 2. In principle, annular projections 5 should be located as close to the edges of the tile as practically possible to ensure seam integrity between tiles, and to ensure that the resulting product performs acceptably without adhesive, in particular, during exposure to traffic/walking and rolling loads after installation. In some embodiments, annular projections 5 are symmetrical with dimensions equal in both longitudinal and transverse directions providing maximum adhesion in both directions. In other embodiments, annular projections 5 have the shape of ovals, rectangles, or other geometric shapes with zero, or only one axis of symmetry, often a symmetry ratio between major dimension (length) and minor dimension (width) through the "center of figure" of about 6.4 cm or less has been employed with good results. In another embodiment, the symmetry ratio is about 3.8 cm or less. As shown in FIGS. 7 and 8, annular projections 5 may have a square or rectangular shape and be arranged so as to share common walls 20' within array 4. In FIGS. 9 and 10, annular projections 5 may have a square or rhomboidal shape arranged with common walls 20' within array 4, and an exposed, top edge 15 of each common walls 20' defining a concave surface 15'.

The distribution of annular projections 5 and the relative size of internal passageways 9 on backing layer 3 determine the increase in adhesion to the underlying surface that will be produced by the partial vacuum formed between each internal passageway 9 and backing layer 3. The number of annular projections 5 on the exposed surface of backing layer 3 is in the range from about 2,000 to about 6,000 per square foot. Often, the size of internal passageway 9 has a maximum horizontal dimension from a vertical sidewall through the "center of figure" of annular projections 5 to the opposite vertical sidewall in the range of 0.05 cm to 0.65 cm. The maximum horizontal dimension of internal passageways 9, where the decorative layer is resilient flooring, is in the range of 0.05 cm to 0.33 cm. In some embodiments, the width 14 of annular projections 5 can also be varied, but is generally in the range of 0.04 cm to 0.25 cm. In some embodiments the height 16 of annular projections 5 is between 0.01 cm-0.02 cm, and in other embodiments height 16 may be in a range between 0.0076 cm-0.00127 cm. Height 16 of annular projections 5 is important in defining the volume of internal passageway 9, and the ability to create a vacuum when compression is applied to the decorative floor tile. Additionally, when included, concave surface 15 of annular projections 5 which is normally in physical contact with the underlying subfloor facilitates creation of a further partial vacuum during compression. However, in less preferred embodiments surface 15 may be flat, i.e., non-concave. This flat region is located near the center of the surface 15 and not adjacent either vertical wall 12, 13 of annular projections 5.

Figure 11:
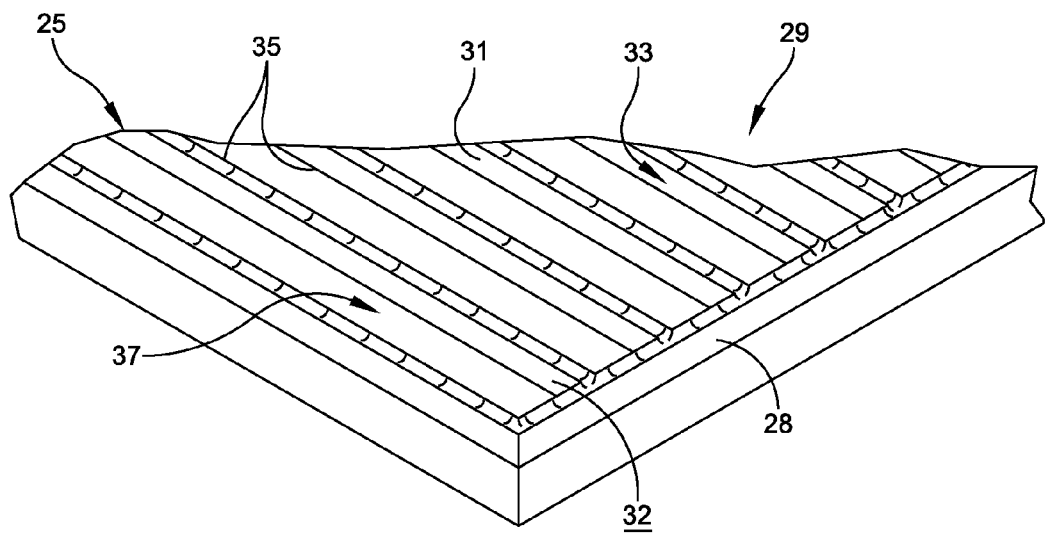
FIG. 11 is a broken-away, perspective view of a further embodiment of decorative floor tile formed in accordance with the invention, showing a backing layer including a linear array of resilient projections.
Figure 12:
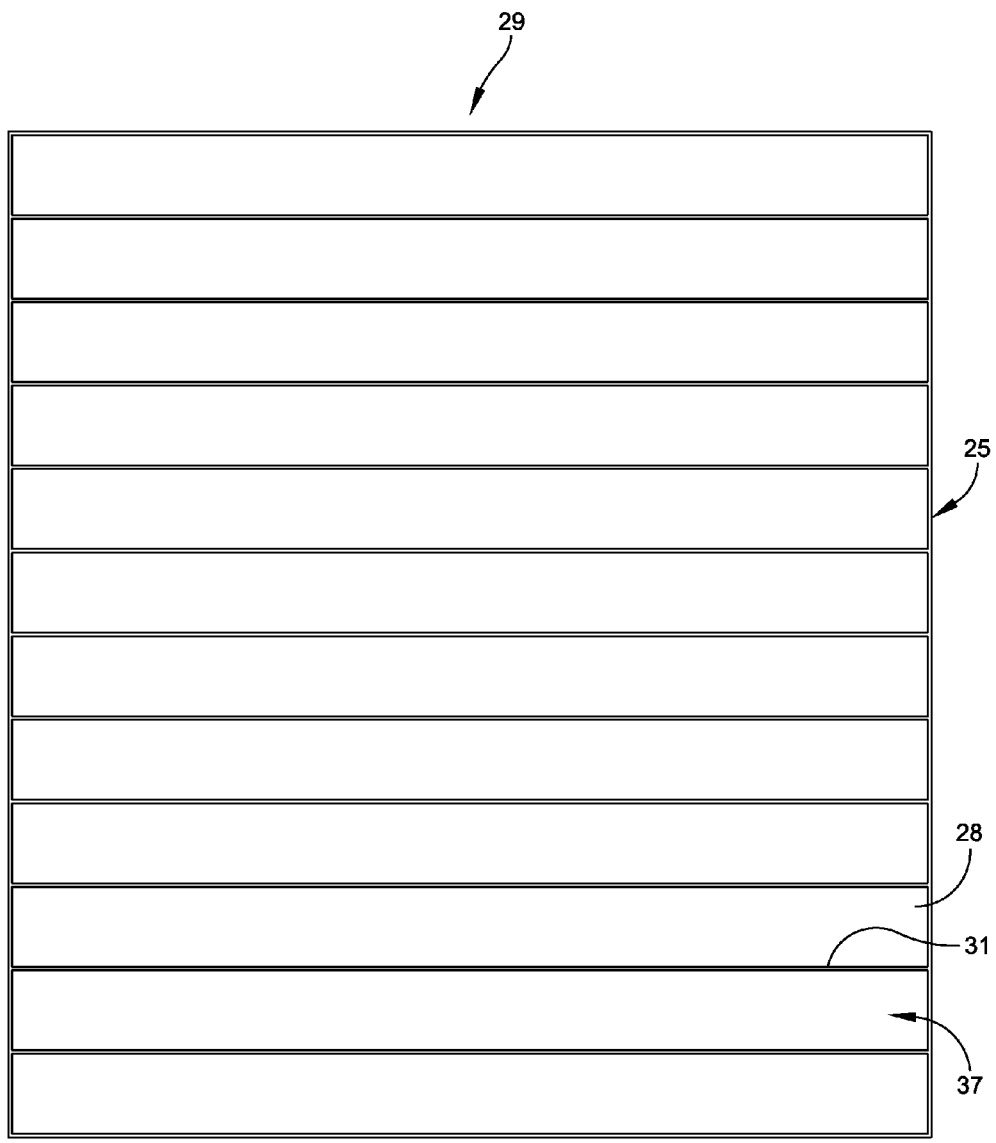
FIG. 12 is a plan view of the embodiment shown in FIG. 11, illustrating one pattern of array of resilient projections on an exposed face of a backing layer.
Figure 13:
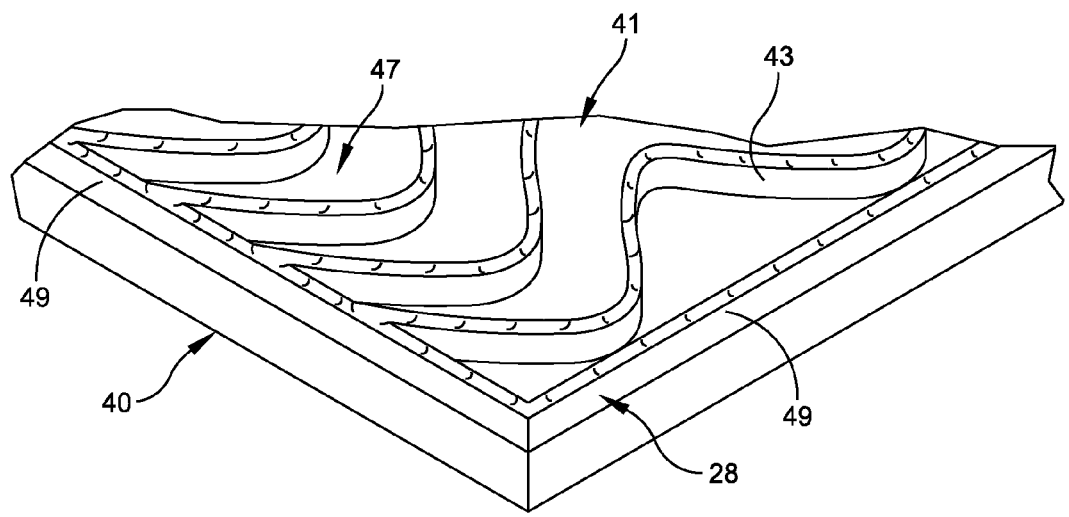
FIGS. 13 and 15 are a broken-away, perspective views of yet other embodiments of decorative floor tile formed in accordance with the invention, showing a backing layer including oscillating arrays of resilient projections.
Figure 14:
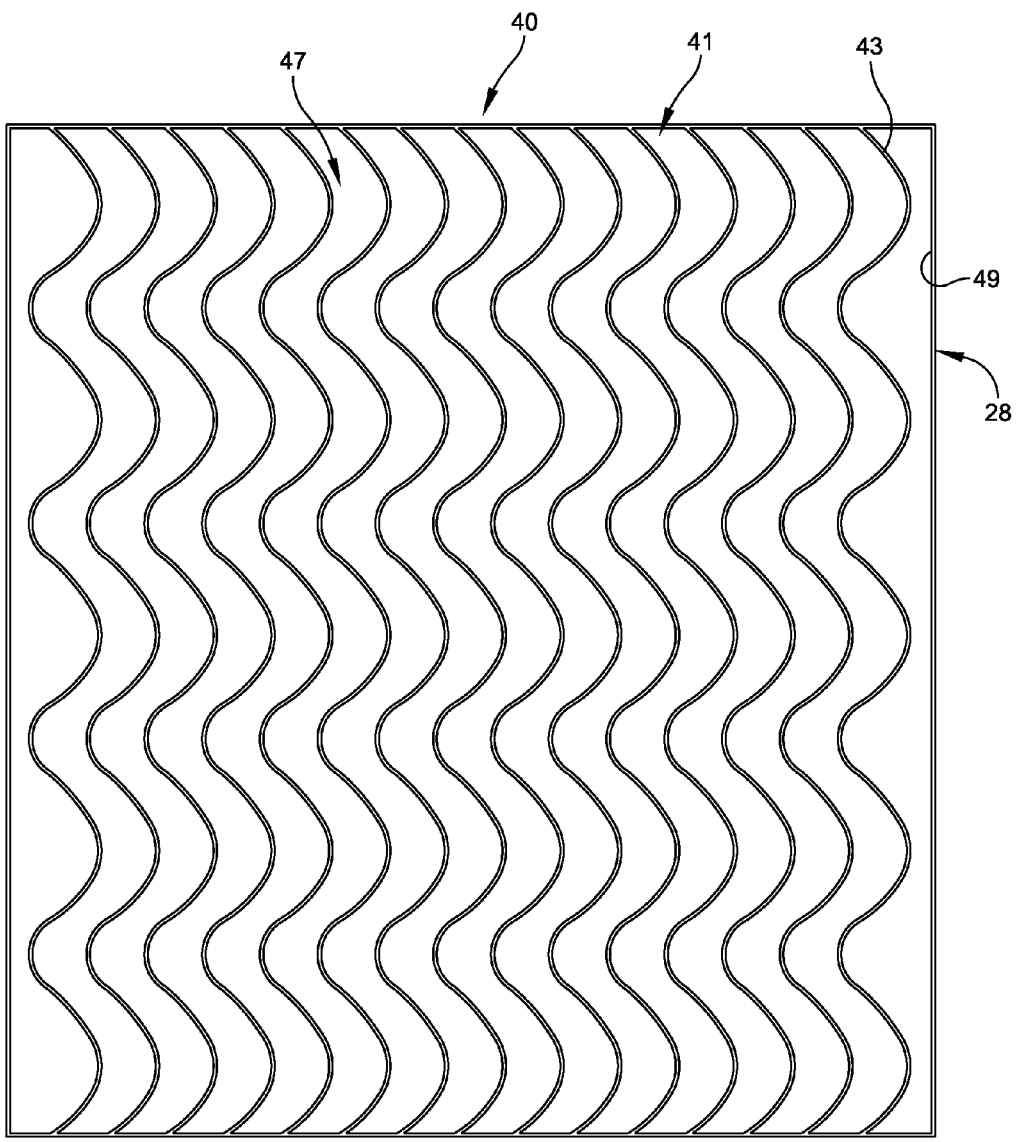
FIGS. 14 and 16 are plan views of the embodiments shown in FIGS. 13 and 15 respectively, illustrating patterns of arrays of resilient projections on an exposed face of a backing layer.
Figure 15:
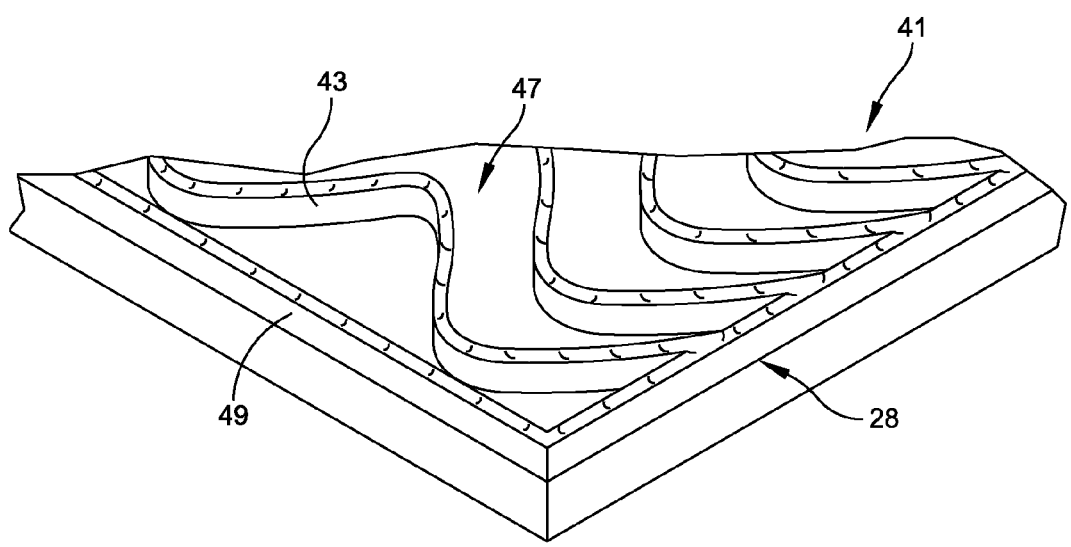
Figure 16:
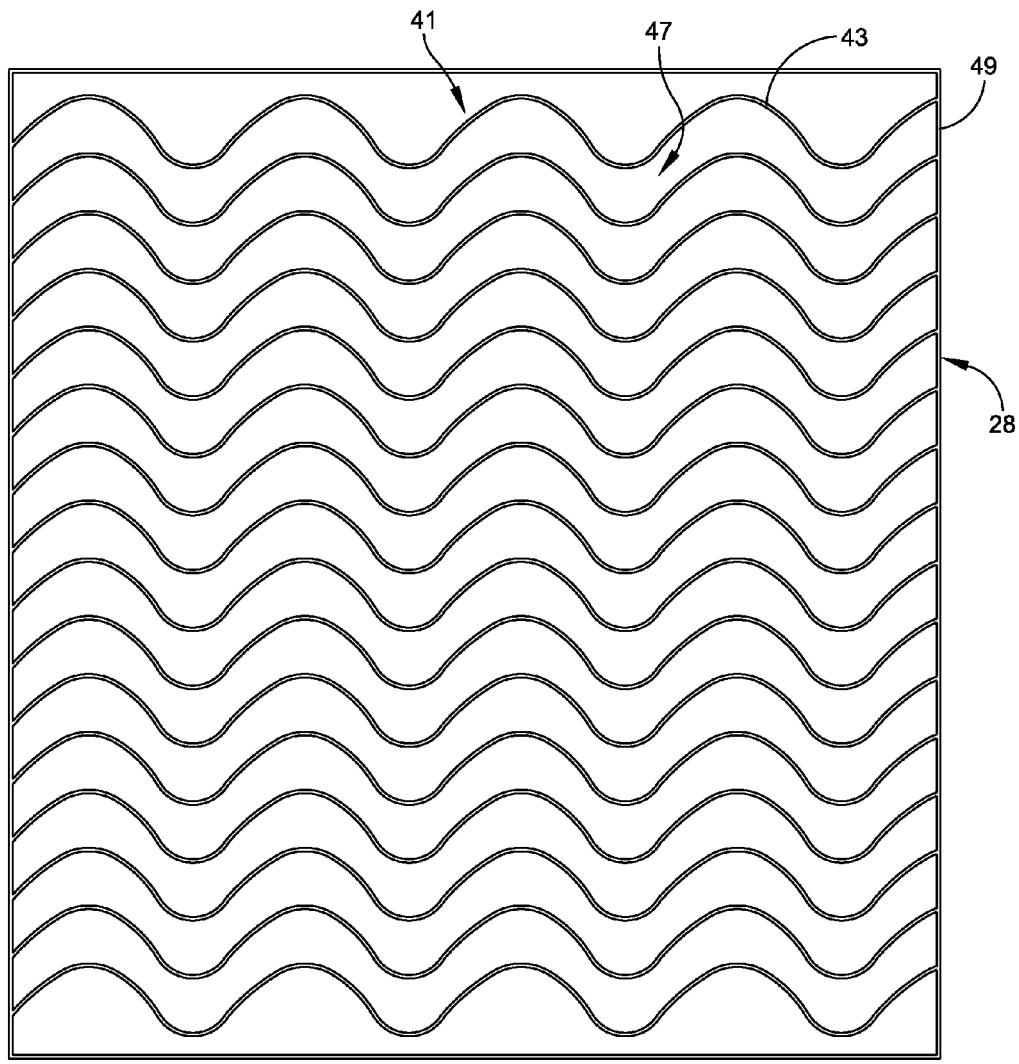

Referring to FIGS. 11-12, alternative embodiments provide a decorative floor tile 25 with at least one decorative layer and a backing layer 28 comprising an array 29 of resilient walls 31 that project outwardly from the outer surface of backing layer 28, wherein each wall 31 comprises an exposed top surface, an outside wall surface 32, and defines at least one void between adjacent walls 31. Decorative floor tile 25 includes a backing layer 28 comprising an array 29 of continuous linear projections 33, often organized in rows 35, with passageways 37 defined offset on center between rows 35 across array 29. Linear projections 33 each comprise a substantially straight, internal wall that projects upwardly from backing layer 28 so as to define passageways 37. Linear projections 33 may be between 0.050 mm and 1.0 mm in height above the surface of backing layer 28, and have a thickness in the range from about 0.300 mm to about 0.400 mm. For resilient tile/plank type products the height will often be in a range of from 0.050 mm-2.0 mm. If the decorative surface covering is a more rigid material, such as a laminate type product, the height of linear projections 33 may be increased.

Referring to FIGS. 13-16, when a person walks on a floor tile, there are two main force vectors that are generated, one representing a compression or "push" load that is directed substantially perpendicular to the sub-floor, and one representing a lateral load that is directed substantially across to the sub-floor, i.e., directed from side to side relative to the sub-floor. If that person turns or pivots on the tile, the lateral load vector increases and gets translated across the floor tile as well. With these things in mind, another alternative embodiment of decorative floor tile 40 includes a backing layer 28 comprising an array 41 of continuous walls 43 that project outwardly from the outer surface of backing layer 28 and oscillate, i.e., move side-to-side, often periodically, relative to the surface of back layer 28, while each wall 43 maintains a substantially constant height above the surface of back layer 28 and along its length. The pattern of continuous walls 43 often has a sinusoidal look against back layer 28, although the pattern need not be periodic or uniform. In some embodiments, continuous walls 43 define a substantially sinusoidal curve, and are often organized in oscillating rows 43, with passageways 47 defined offset on center across array 41. The present invention does not, however, limit the waveforms used to identical wave patterns, periods, to a particular waveform (such as a sine wave, cosine wave, etc.), a particular orientation, or to a particular offset (see FIGS. 15-18). The properties desired in array 41 may require a non-periodic waveform or a combination of waveforms of any type for continuous walls 43. One advantage associated with the foregoing embodiments of the present invention is that when the tile is compressed, for example by walking, a partial vacuum is created within the void regions that are bounded by continuous resilient walls 43 so that when pressure is applied to the decorative layer, any twisting action from the walking, i.e., variable lateral loading from turning or pivoting, will create a responsive force vector. The pitch and period of oscillating walls 43 will translate more of the lateral force vector along the wall. This will reduce the stress on oscillating walls 43, as well as improve contact of oscillating walls 43 with the subfloor so as to better maintain the partial vacuum and friction. If no pivoting or turning is present, the lateral force vector will be parallel with the push load, but one hundred and eighty degrees out of phase with the walking direction.

Figure 17:
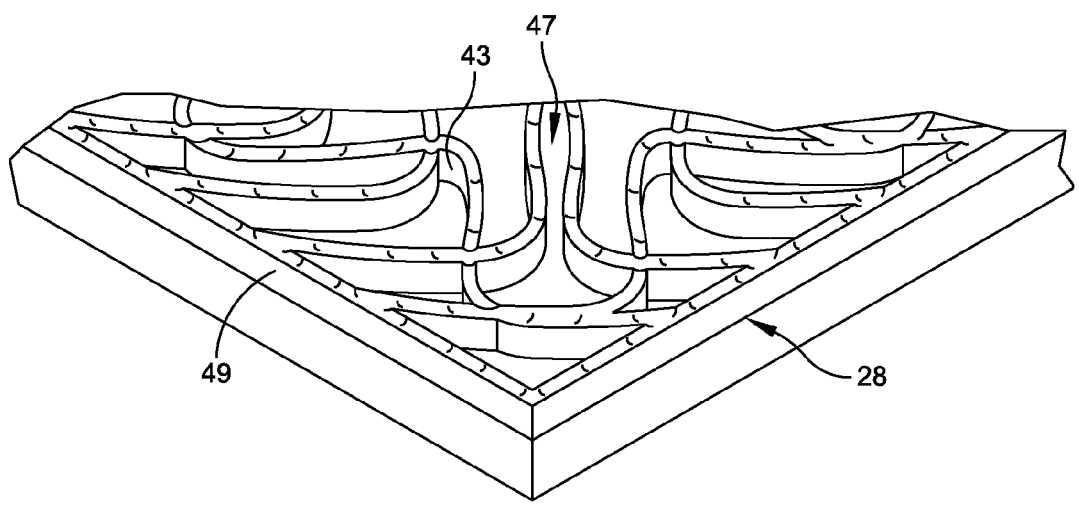
FIG. 17 is a broken-away, perspective view of one more embodiment of decorative floor tile formed in accordance with the invention, showing a backing layer including an array of resilient projections formed by combining the transverse and longitudinal arrays of resilient projections.
Figure 18:
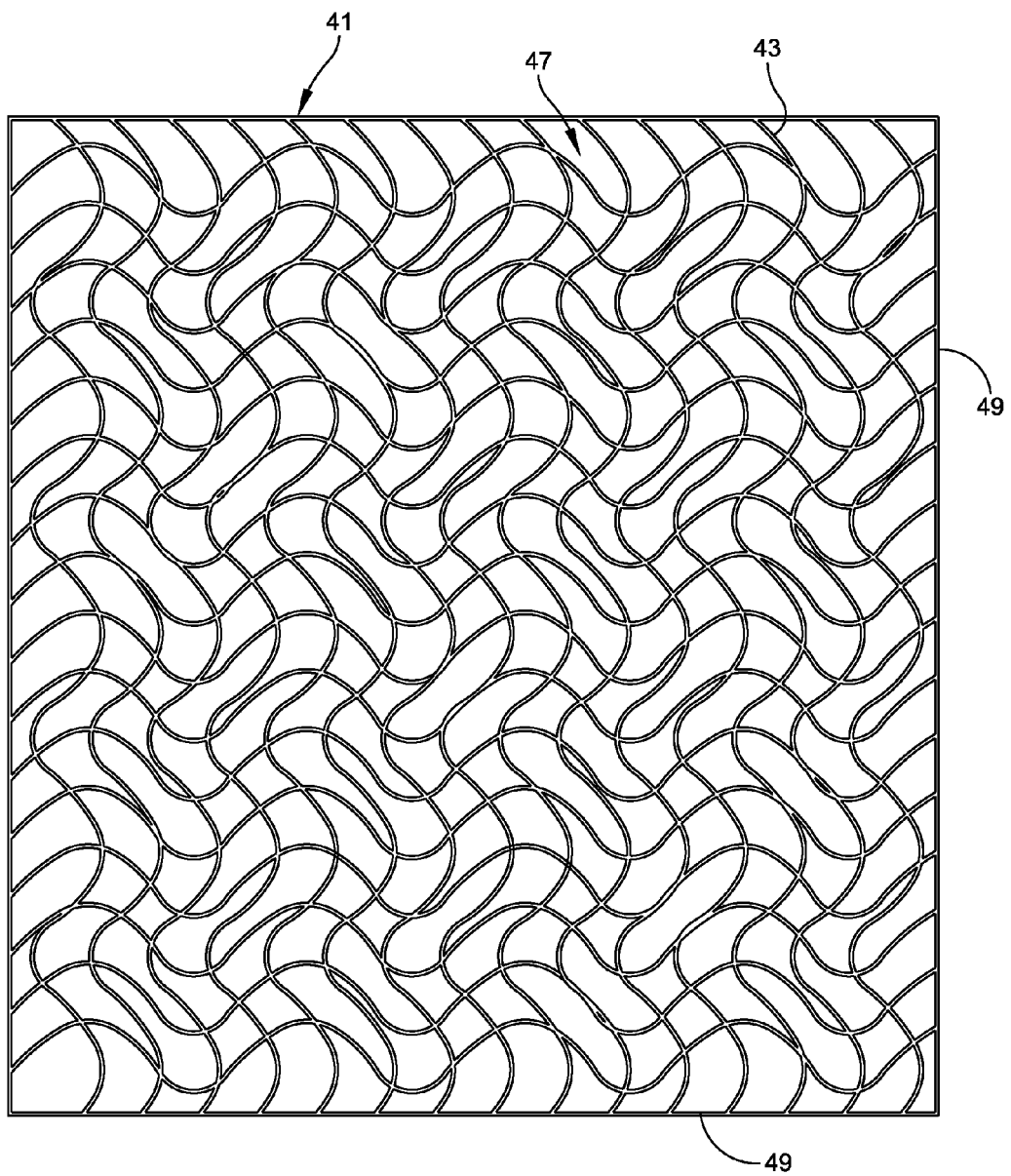
FIG. 18 is a plan view of the embodiment shown in FIG. 17, illustrating one pattern of array of resilient projections on an exposed face of a backing layer.

Oscillating walls 43 each form an internal wall that projects upwardly from backing layer 28 so as to define passageways 47 and often run either transversely or longitudinally relative to peripheral edge walls 49 of backing layer 28. As shown in FIGS. 17 and 18, continuous oscillating walls 43 may also be arranged both transversely and longitudinally on the same surface of backing layer 28. In many cases, oscillating walls 43 may be between 0.050 mm and 1.0 mm in height above the surface of backing layer 28, and have a thickness in the range from about 0.300 mm to about 0.400 mm. For resilient tile/plank type products the height will often be in a range of from 0.050 mm-2.0 mm. Walls 43 of array 41 are arranged with respect to one another so as to define one or more void regions that are bounded by resilient walls so that when pressure is applied to the decorative layer, a partial vacuum is formed within some or all of each void region associated with the pressure load allowing the decorative floor tile to remain in place on a surface in the absence of adhesive. In addition, the waveform provides a gradient of resistance along the loading direction, i.e., along the direction of energy transfer from the load applied to the surface of decorative layer 2, thereby significantly improving distribution of shear forces at the interface between each of continuous oscillating walls 43 and the underlying surface with which they are in contact. This arrangement provides improved adhesion of decorative floor tile 2 to the under lying subfloor surface as compared to prior art adhesive-based tile systems.

Array of resilient projections 41 are best formed from materials that are able to spring back quickly into shape after being bent, stretched, or squashed, i.e., resilient materials that are capable of storing and releasing energy. Elastomeric compounds are one such resilient material that has been found to yield acceptable results when incorporated with the structures of the present invention. Any elastomeric composition that is compatible with the decorative layer 2 may be selected for the backing layer. Typical elastomeric compounds, provide acceptable physical performance, and possess adequate coefficient of friction properties to maintain the decorative floor tile in place without adhesive. In one embodiment, the elastomeric composition is a flexible vinyl composition including plasticized pvc or pvc/polymeric blend. In another embodiment, rubber materials including thermoplastic and thermoset rubber compositions are employed. The rubber compositions can include, but are not limited to natural or synthetic rubbers, acrylic elastomers, polyester elastomers, polyurethane elastomers, pvc elastomers, polyolefin elastomers, and blends of these materials. The elastomers can comprise homo-polymers, co-polymers, ter-polymers, block co-polymers or blends thereof. An optimal wave shape for oscillating walls 43 can be influenced by the desired structural response, e.g., a non-periodic, non-sinusoidal wave shape may be preferred in some instances. There are other variables such as selection of materials, relative thickness of the entire decorative floor tile that are important for correct design in addition to selection of wave shape. The selection of these details will be necessarily customized for different designs and will be obvious to one skilled in the art, upon review of this disclosure.

In another embodiment, fiberglass fibers are incorporated into the vinyl tile or plank structure comprising the backing layer of the invention. Incorporation of fiberglass fibers provides increased dimensional stability and also improves flame resistance properties of the composite. In one embodiment, the fiber glass fibers are directly incorporated into the vinyl tile or plank structure before the backing layer of the invention is applied. In another embodiment, the fiberglass fibers are incorporated into the backing layer before or during lamination/molding onto the tile or plank structure. It is understood that the fiberglass fibers can comprise individual glass fibers, or non-woven or woven glass mats. Additionally, other fibers can be employed if they impart the improved dimensional stability and flame resistance.

The process of manufacturing a decorative floor tile in accordance with one embodiment of the invention involves the following steps: 1) selecting a decorative layer, for example a 6"×36" Luxury Vinyl Tile Plank; 2) designing an appropriate array of projections to fit size and properties of the selected decorative layer; 3) manufacturing the backing layer comprising the array of projections; and laminating the backing layer to the decorative layer to produce the product of this invention. In some instances, the third step involves making a metal plate or mold that is a "negative" of the array of Step 2), applying an elastomeric composition onto the metal plate or mold, and using a predetermined pressure and heat to cause the elastomeric material to fill the negative plate, thus creating the array, At this point, the elastomeric backing layer can be removed from the metal plate or mold and subsequently laminated to the decorative layer, or the decorative layer can be placed onto the elastomeric coated metal plate or mold and laminated to the decorative layer using heat and pressure, and subsequently removed. The pattern for any particular array may be machined in the aluminum plate to the desired depth and shape of the projections. The machining tool is often equipped with the desired concave surface and width of annular projections 5. In another method a polymeric elastomeric layer is prepared and mechanically embossed using an embossing roll or plate to produce the selected array of Step 2. This process can be utilized with thermoplastic and thermoset elastomeric compositions. Generally, the thermoset elastomer layer will be embossed before final curing of the thermoset elastomeric composition.

Lamination of the decorative layer and the backing layer with an array of projections formed in accordance with the present invention can be accomplished by many known techniques. In addition to utilizing heat and pressure to accomplish the lamination, the use of an adhesive layer between the decorative layer and the base layer may be required. Many of the adhesives known to those of ordinary skill in the flooring arts exist for this purpose. The only requirement of the adhesive is that it is chemically compatible with the decorative layer and the backing layer, and provides acceptable performance during the lifetime of the installed decorative floor tile. It will be understood that the backing layer can be manufactured in sheet form with multiple decorative layers laminated thereto.

The proceeding description of the invention has shown and described certain embodiments thereof; however, it is intended by way of illustration and example only and not by way of limitation. Those skilled in the art should understand that various changes, omissions and additions may be made to the invention without departing from the spirit and scope of the invention as defined by the claims.

What is claimed is:

1. An adhesiveless decorative floor tile comprising:
   at least one decorative layer comprising a Luxury Vinyl Tile; and
   a non-porous backing layer comprising an array of resilient continuous oscillating walls that project outwardly from an outer surface of said backing layer, wherein said walls define an array of continuous oscillating passageways arranged so that when pressure is applied to said decorative layer, a partial vacuum is formed within at least one of said continuous oscillating passageways allowing said decorative floor tile to remain in place on a surface in the absence of adhesive.

2. The adhesiveless decorative floor tile of claim 1 wherein said continuous walls maintain a substantially constant height above said surface of said back layer.

3. The adhesiveless decorative floor tile of claim 2 wherein said continuous walls define a sinusoidal pattern.

4. The adhesiveless decorative floor tile of claim 1 wherein said continuous walls define a pattern that is at least one of non-periodic and non-uniform.

5. The adhesiveless decorative floor tile of claim 1 wherein each of said continuous walls define a substantially sinusoidal curve.

6. The adhesiveless decorative floor tile of claim 2 wherein said continuous walls are organized in oscillating rows, with said oscillating passageways being defined offset on center between said rows.

7. The adhesiveless decorative floor tile of claim 3 wherein said continuous walls are arranged both transversely and longitudinally on the same surface of said backing layer.

8. The adhesiveless decorative floor tile of claim 1 wherein said continuous walls have a height above said surface of said backing layer in the range from about 0.050 mm to about 1.0 mm, and have a thickness in the range from about 0.300 mm to about 0.400 mm.

9. The adhesiveless decorative floor tile of claim 1 wherein said continuous walls are arranged with respect to one another so as to define one or more void regions that are bounded by said resilient walls so that when pressure is applied to said decorative layer, a partial vacuum is formed within some or all of each void region allowing said decorative floor tile to remain in place on a surface in the absence of adhesive.

10. The adhesiveless decorative floor tile of claim 1 wherein said continuous walls provide a gradient of resistance along a loading direction thereby distributing shear forces at the interface between each of said continuous walls and an underlying surface.

11. An adhesiveless decorative floor tile comprising:
    at least one decorative layer comprising a Luxury Vinyl Tile; and
    a backing layer comprising an array of resilient continuous periodically oscillating walls that project outwardly from an outer surface of said backing layer, wherein said walls have a non-porous surface and define an array of continuous periodically oscillating passageways arranged so that when pressure is applied to said decorative layer, a partial vacuum is formed within at least one of said continuous oscillating passageways allowing said decorative floor tile to remain in place on a surface in the absence of adhesive.

12. The adhesiveless decorative floor tile of claim 11 wherein said continuous walls maintain a substantially constant height above said surface of said back layer.

13. The adhesiveless decorative floor tile of claim 12 wherein said continuous walls define a sinusoidal pattern.

14. The adhesiveless decorative floor tile of claim 13 wherein said continuous walls define a pattern that is at least one of non-periodic and non-uniform.

15. The adhesiveless decorative floor tile of claim 14 wherein each of said continuous walls define a substantially sinusoidal curve.

16. The adhesiveless decorative floor tile of claim 14 wherein said continuous walls are organized in oscillating rows, with said oscillating passageways being defined offset on center between said rows.

17. The adhesiveless decorative floor tile of claim 16 wherein said continuous walls are arranged both transversely and longitudinally on the same surface of said backing layer.

18. The adhesiveless decorative floor tile of claim 11 wherein said continuous walls are formed from a material that is able to spring back quickly into shape after being bent, stretched, or squashed.

19. An adhesiveless decorative floor tile comprising:
- at least one decorative layer comprising a Luxury Vinyl Tile; and
- a backing layer comprising an array of resilient linear walls that project outwardly from an outer surface of said backing layer, wherein said walls have a non-porous surface and define an array of continuous oscillating passageways arranged so that when pressure is applied to said decorative layer, a partial vacuum is formed within at least one of said continuous oscillating passageways allowing said decorative floor tile to remain in place on a surface in the absence of adhesive.

\* \* \* \* \*